United States Patent [19]

Coulter et al.

[11] 3,863,159
[45] Jan. 28, 1975

[54] PARTICLE ANALYZING METHOD AND APPARATUS HAVING PULSE AMPLITUDE MODIFICATION FOR PARTICLE VOLUME LINEARIZATION

[75] Inventors: Wallace H. Coulter, Miami Springs; Edward Neal Doty, Pompano Beach, both of Fla.

[73] Assignee: Coulter Electronics, Inc., Hialeah, Fla.

[22] Filed: May 7, 1973

[21] Appl. No.: 357,888

[52] U.S. Cl. .................... 328/117, 328/55, 328/61, 328/66, 328/150, 328/163, 324/188
[51] Int. Cl. ............................................. H03k 5/20
[58] Field of Search ............ 328/117, 116, 115, 61, 328/55, 150, 162, 163, 164, 66; 324/188

[56] References Cited
UNITED STATES PATENTS

| | | | |
|---|---|---|---|
| 2,996,624 | 8/1961 | Mumma | 328/116 |
| 3,095,541 | 6/1963 | Ashcraft | 328/115 |
| 3,371,342 | 2/1968 | Carre | 328/61 X |
| 3,489,921 | 1/1970 | Mietz et al. | 328/150 X |
| 3,532,905 | 10/1970 | Zijta et al. | 328/55 X |

Primary Examiner—John S. Heyman
Attorney, Agent, or Firm—Silverman & Cass, Ltd.

[57] ABSTRACT

The amplitude of each of the pulses derived from a Coulter type of electronic particle analyzer is modified to compensate for amplitude error that results when the particle traverses non-uniform field portions of the scanning aperture path of the particle analyzer. By measuring the pulse amplitude at its center point and at two "shoulder" points located on opposite sides of the center point, a summing and comparison involving the pulse amplitudes at these three points is developed which effectively generates a modified pulse amplitude at the time of the center amplitude. The thus modified center amplitude is a more accurate measure of the volume of each particle and there results an improved linearizing of the particle volume pulse amplitude relationship which enhances the resolution of particle sizing data.

34 Claims, 5 Drawing Figures

PARTICLE ANALYZING METHOD AND APPARATUS HAVING PULSE AMPLITUDE MODIFICATION FOR PARTICLE VOLUME LINEARIZATION

BACKGROUND OF THE INVENTION

This invention concerns the measurement of microscopic particles and is directed toward improving the measuring resolution of particle analysis according to the well known teachings of the Coulter principle of electronic particle analysis. The Coulter principle is set forth basically in U.S. Pat. No. 2,656,508 and has been the subject of numerous improvements over the past 20 years. U.S. Pat. No. 3,259,842 describes the commercialized "Coulter Counter" Model B product.

According to the Coulter principle, when a microscopic particle in suspension in an electrolyte is passed through an electrical field of small dimensions approaching those of the particle, there will be a momentary change in the electric impedance of the electrolyte in the ambit of the field. This change of impedance diverts some of the excitation energy into the associated circuitry, giving rise to an electrical signal. Such signal has been accepted as a reasonably accurate indication of the particle volume for most biological and industrial purposes. Apparatus embodying the teachings of U.S. Pat. No. 2,656,508 has been used to count and size particles in biological fluids, industrial powders and slurries, etc.

The principles of the present invention apply to Coulter particle analyzing apparatus in which the excitation of the field is achieved by means of unidirectional or low frequency power sources or radio frequency power sources.

In commercial versions of the Coulter particle analyzing apparatus, the electric field of small dimensions has been formed commonly by a microscopic right cylindrical passageway or aperture, as it is known, betweem two bodies of liquid in which the particles to be studied are suspended. The electrical excitation energy is coupled to these bodies by means of electrodes respectively located in the liquid bodies, the aperture being formed in an insulating wall between the bodies. The suspension is caused to flow through the aperture carrying the particles with the flow and giving rise to the electric signals produced by the momentary changes in impedance caused by the respective particles as they pass through the aperture. The electric field is concentrated in the aperture and normally comprises an electric current flowing through the aperture along with the physical flow of suspension.

By counting the signals produced, one can count the particles passing through the aperture. By discriminating between different pulse amplitudes, one can make size studies. This invention is primarily concerned with size studies, and has, as a very important object thereof, the provision of apparatus which will enable highly accurate particle size data to be achieved.

It has been verified that the electric field halfway through the aperture, being the position most remote from the entrance and exit of the aperture, is most uniform and has the most uniform current distribution for all paths through the aperture. The longer the aperture, the more nearly uniform is the field at this midpoint. At the entrance and exit of the aperture, the current density is greater at the edges of the aperture and correspondingly lesser on the axis of the aperture. This may be explained by pointing out the current paths other than the axial path are suppled from the sides of the aperture as well as straight ahead. The lower current density on the axis at the entrance and exit results in a lower instantaneous signal than is the case for particles entering the aperture and leaving it on other paths. In other words, the current density at the corners of the aperture is greater than at the axis.

U.S. Pat. 3,668,531 discusses the current density phenomenon and teaches circuitry for detecting and measuring a particle when it is halfway through the aperture path. Such circuitry effectively measures the particle-pulse amplitude at its center, regardless of pulse peaks before, at, or after the pulse center. Such circuitry has been identified as a "center-finder."

Another phenomenon that affects the accurate measurement of particles according to the Coulter principle is electrolyte and particle velocity relative to different portions of the aperture path. The velocity of electrolyte flow, and hence the velocity of particles also, is somewhat greater on an axial path than on paths closer to the edges of the aperture or paths which are off-center, because the liquid does not have to change direction when it goes through the axial center of the aperture. The resistance to flow is a minimum on the axis since it is surrounded by a moving sheath of liquid having substantially the same velocity.

According to the teaching of U.S. Pat. 3,701,029, particle passing axially through the aperture path are the only particles which are permitted to be regarded by the apparatus, the others being disregarded. The electronic selection is based on the fact that the particles following axial paths spend the least time in the ambit of the aperture, and therefore their corresponding pulses have the shortest duration. Theoretically, all pulses passing through the aperture, regardless of size, will have the same duration; but because of the reasons given above, this is not practically true. Pulses which pass through the aperture off-center will normally have longer durations.

Although the axial trajectory sensor of U.S. Pat. No. 3,701,029 provides data of high quality for those particles it does not reject, it is subject to the disadvantage that it must reject a portion of the particle population of a sample and to that extent there is a degradation in the statistical accuracy of the data. Such statistical degradation is undesirable in certain types of particle analysis.

SUMMARY OF THE INVENTION

According to the present invention, the limitations of the prior art axial trajectory sensor are substantially overcome by circuitry which applies an amplitude modification factor to all particle-pulses, so as to generate the same center amplitude result as if all particles were passing through the aperture along the same path. The thus modified center amplitude is strobed by center finding circuitry. The amount of modification applied to the pulse amplitude is derived from the difference between the center amplitude and the amplitude of that pulse at two points on opposite sides of the center amplitude. These two points hereinafter will be termed "shoulder points" even though they need not be at the locations of the pulse wave form generally known as its shoulders.

BRIEF DESCRIPTION OF THE DRAWINGS

In FIG. 1, there is illustrated the sectional profile of a typical wafer 10 in a "Coulter Counter" counting and sizing apparatus having an aperture 12 therein. The structure is shown idealized, that is, with perfectly cylindrical bore and precisely sharp edges 14 and 16. When the aperture current is established in the apparatus, it flows through the aperture from one side to the other, as for example, from the left side to the right. The entire volume illustrated is filled with the sample fluid or electrolyte, but no symbols are used to illustrate this in order to keep the view simple. As the electric current passes through the liquid, the electric current density at the aperture is different than it is throughout other parts of the bodies of fluid through which the current passes. In the aperture itself, the electric current density will vary from location to location. Importantly, the current density at the corners 14 and 16 will be very much greater than anywhere else.

Figure 1:
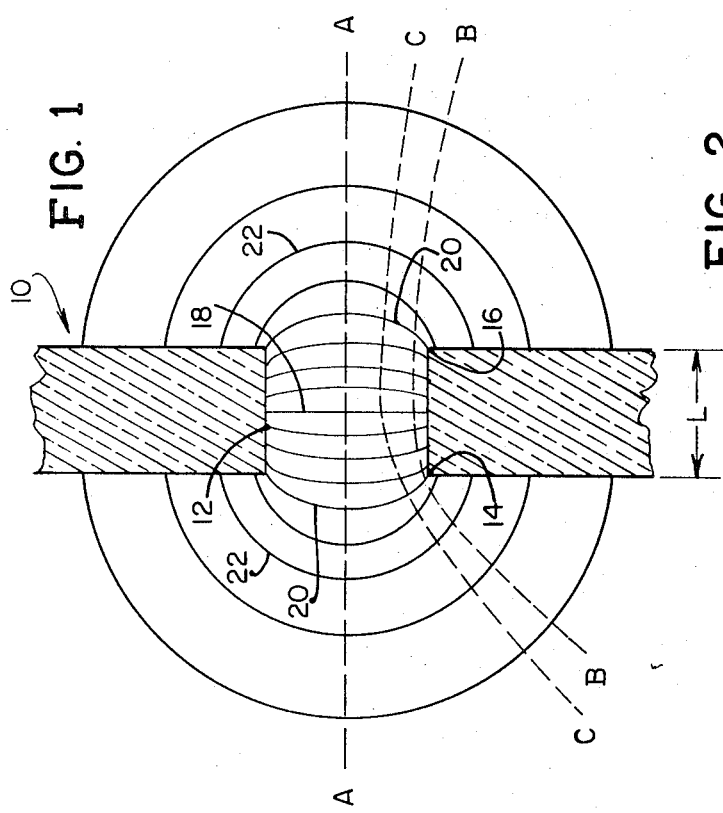
FIG. 1 is a diagrammatic view illustrating the greatly magnified profile of an aperture and its sensing field, with three particles passing therethrough.

In order best to illustrate this, isopotential lines are illustrated in FIG. 1. These lines are shown to be perpendicular at every point where they touch the outer surface of the wafer 10, being transverse of the bore 12 at 18, slightly bulging out at ends 20, and being quite arcuate at the outer surface of the bulge 22. It will be appreciated that electric current density at any location is proportional to the number of equipotential surfaces in any given volume at that location. Although the current density in the aperture 12 generally is greater than it is outside of the aperture, the current density is a maximum at the corners 14 and 16, where the electric current turns the corner, so to speak, to enter the aperture 12 and therefore, is greater than in the center of the aperture.

Consider now, three particles A, B and C passing through the aperture from left to right along the broken line paths A, B, and C, shown in FIG. 1. The first particle A traverses approximately the axis of the aperture with the physical stream of liquid and, as it passes from left to right through the influence of the increased current density, its maximum effect upon the resistance of the ambit of the aperture is near the center of the aperture where the isopotential lines 18 are closest and parallel to each other. Considering the graph of the resulting electrical pulse A, shown in FIG. 2, which may be assumed to have been made by some detecting means, its maximum amplitude is designated Amp. A and is proportional to the volume of the particle A. The duration of the pulse is equal to the time which the particle was within the ambit of the aperture, that is, within its electrical influence. This is considerably more than L, the length of the aperture 12, since as noted, there is a convex bulge of relatively high electric current density (evidenced by the isopotential lines 20 and 22) outside of the geometric confines of the aperture. Nevertheless, its duration above a minimum threshold is significantly less than that of pulses B and C, since the flow stream along the aperture axis is faster than closer to the walls of the aperture.

If all particles follow paths similar to the path A, or quite close to the center of the aperture 12, then all of the resulting pulses would have the appearance of the pulse A, differing only in amplitude proportional to the extent that the particles differ in volume. For purposes of the discussion and the wave forms illustrated, the particles which traverse the paths B and C are to be assumed to be identical in volume to the particle which traverses the path A.

Consider the particle moving along the path B. As the particle passes into the ambit of the aperture 12, it starts to produce the pulse leading edge in a manner different than the pulse at A, because when it passes close to the corner 14, where the current density is a maximum, the effect is as though the resistivity of the aperture 12 was increased quite substantially at that point. Accordingly, there will be a faster rise time and a peak 24 of amplitude Amp. B at the beginning of the pulse. As the particle enters the aperture 12, it moves into the influence of the electric current areas where the density is quite uniform, transverse of the axis of the aperture but less than at the corner 14. As a result, the amplitude drops significantly. The isopotential lines 18 here are shown to be parallel and, if this is considered a sectional view, the isopotential lines should be considered isopotential planes. The studies were made with profiles, but are valid with three dimensional forms.

As the particle along the path B leaves the aperture 12, it passes close to the corner 16 through a region of high current density and, therefore, another peak is generated at 26, which might not be as large as the peak 24, but which would be larger than the center of the pulse indicated at 28. More likely, the particle would approach the axis of the stream so that the pulse's trailing edge would be similar to the trailing edge of pulse caused at A, but at a later time, since the duration of pulse B remains affected by the flow stream rate of motion.

The pulse shown at B is somewhat of an extreme occurrence in order to demonstrate the efficacy of the theory of operation of the invention. The amplitude of the center 28 of the pulse is shown to be much greater than Amp A, even though the particle generates this portion of the signal while in the region 18. That the amplitude of the pulse B at 28 is significantly greater than Amp. A, even though the two particles A and B are of the same volume, evidences the fact that the teaching of U.S. Pat. No. 3,668,531 did not fully resolve the problem, but only reduced the measuring error by detecting not the pulse peak, but only its center amplitude value. The center amplitude 28 is erroneously high for at least two reasons: (1) there was insufficient time between the peaks 24 and 26 for the amplitude at 28 to decay a true steady state condition, approaching Amp. A; (2) the isopotential field close to the aperture walls is of a higher current density than along the axis of the aperture path, as shown in FIG. 1. Hence, even if the aperture path length was much longer and even if there was no effect by the corner 16, the amplitude of the pulse B could not attain that of Amp. A, but would be somewhat higher. The use of a longer aperture, although it would tend to reduce the above identified error, introduces other forms of measuring and detecting errors which are even less desirable and more difficult to compensate against.

The particle C follows the path C and generates the pulse C, which has a leading edge peak 30 that reflects the fact that the particle approached the aperture 12 close to the corner 14. This pulse is relatively flat topped, with a center 32 and a trailing edge peak 34 since its curved path crossed the isopotential lines 18 at a location where their density was quite similar to the density at the entrance and exit ends 20 of the path C. The amplitude C of the pulse C is greater than the amplitude A, but less than amplitude B and even less than the center amplitude 28 of the particle pulse B, since at all times the particle B is closer to the aperture edges and walls than the particle C. Likewise, its center amplitude 32 has an amplitude different than Amp. A.

According to the discussion above, the configuration of a pulse produced by a particle passing through a given aperture is dependent primarily upon the size of the particle, but secondarily upon the portion of the ambit of the aperture through which the particle passes. If all particles passed through the aperture axis, there would be no problems, but a significant percentage does not pass through the axis and many of these have peaks that increase the improper classification of the particles producing the pulses. Also, the centers of all pulses produced by particles of the same size were not of substantially the same amplitude.

Figure 3:
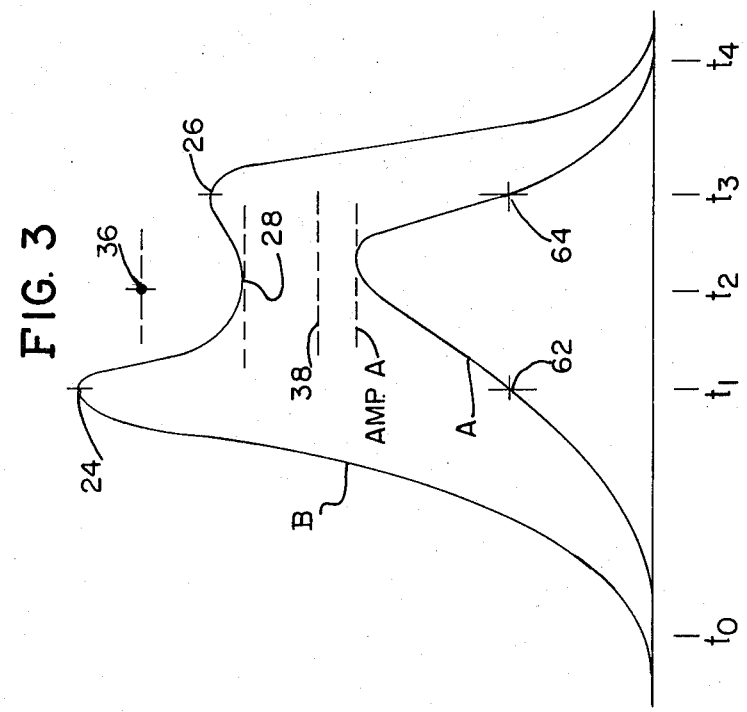
FIG. 3 is a wave form diagram for explanation of the theory of the amplitude modification according to the invention.

FIG. 3 will be employed to explain the basic theory of the present invention. FIG. 3 shows the wave forms A and B greatly magnified, and omits wave form C so as to less complicate this Figure. Since the peaks 24 and 26 contribute to the erroneously high central amplitude 28, the invention utilizes them for effecting a proportional modification of the amplitude 28. The peaks 24 and 26 are the "shoulder" amplitudes hereinbefore mentioned. Their amplitudes are detected and averaged to define a first increment of error modification. The resulting signal has an amplitude 36 which then is compared with the amplitude 28 to define a second increment of error modification which is subtracted from the amplitude 28 to yield the modified amplitude 38.

Setforth as a formula,
$MA = C + (C - \overline{SH})$ in which:
$MA$ = modified amplitude 38,
$C$ = center amplitude 28, and
$\overline{SH}$ = average shoulder amplitude 36.

Unfortunately, the above theory development does not take into consideration certain electrical and geometric parameters of a Coulter type of scanning aperture, as well as the affect that aperture size has upon particle flow therethrough. To increase the accuracy of the theoretical development, first and second factoring constants $k_1$ and $k_2$ are needed. The resulting formula becomes:
$MA = C + (k_2 C - k_1 k_2 \overline{SH})$; or
$MA = C - (k_2 (k_1 \overline{SH} - C)$.

The constant $k_1$ operates to establish an amount of amplitude modification that is proportional to the variations in shape of the particle-pulses away from the ideal shape of pulse A.

Since the amplitude error of a pulse increases only in the positive direction upward from Amp. A, the onstant $k_1$ is to apply increasingly more correction to pulses having more error. Stated differently, for any one particle, depending upon the path it takes through the aperture 12, its average shoulder amplitude $\overline{SH}$ will be increasingly greater the more erroneous is the shape of its particle-pulse. Therefore, it is necessary to apply more amplitude modification, and such is accomplished by $k_1$.

From FIG. 3 it will be recognized that the modified amplitude 38 for the pulse B is above Amp. A by a measurable amount. Accordingly, for the operation of the invention to eliminate this discrepancy between an ideal pulse A, having a center amplitude of Amp. A, and the modified amplitude 38, the invention must effectively increase the amplitude of pulse A to the level 38. The effect of the product of $k_1 \overline{SH}$ is to equal C at the level 38 and thereby bring Amp. A up to the level 38, even though this generates a particle volume measurement larger than the true value. Nevertheless, the fact that the operation of the invention causes all particles of the same volume to have the same effective amplitude 38 is statistically more valuable than the error introduced upon those ideal particle-pulses A.

The second factoring constant $k_2$ applies the same extent of modification to all pulse amplitudes. It is less than unity, since the total amount of amplitude modification is to be less than the absolute difference between the center amplitude and the shoulder average (after the latter has been factored by $k_1$); otherwise there would be too much amplitude correction.

As above stated, the values of $k_1$ and $k_2$ depend upon the size of the aperture 12. For an aperture diameter of one hundred microns, a $k_1$ of 1.15 and a $k_2$ of 0.43 have proved highly satisfactory and can be used as a guide for the empirical determination of $k_1$ and $k_2$ for other aperture sizes.

Figure 2:
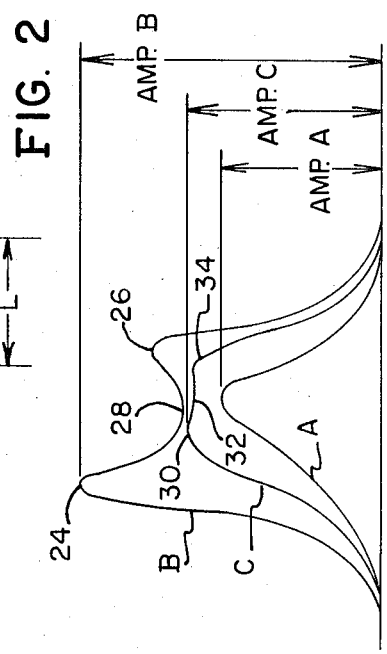
FIG. 2 is a diagram illustrating the three particle pulses resulting from the particles shown in FIG. 1.
Figure 4:
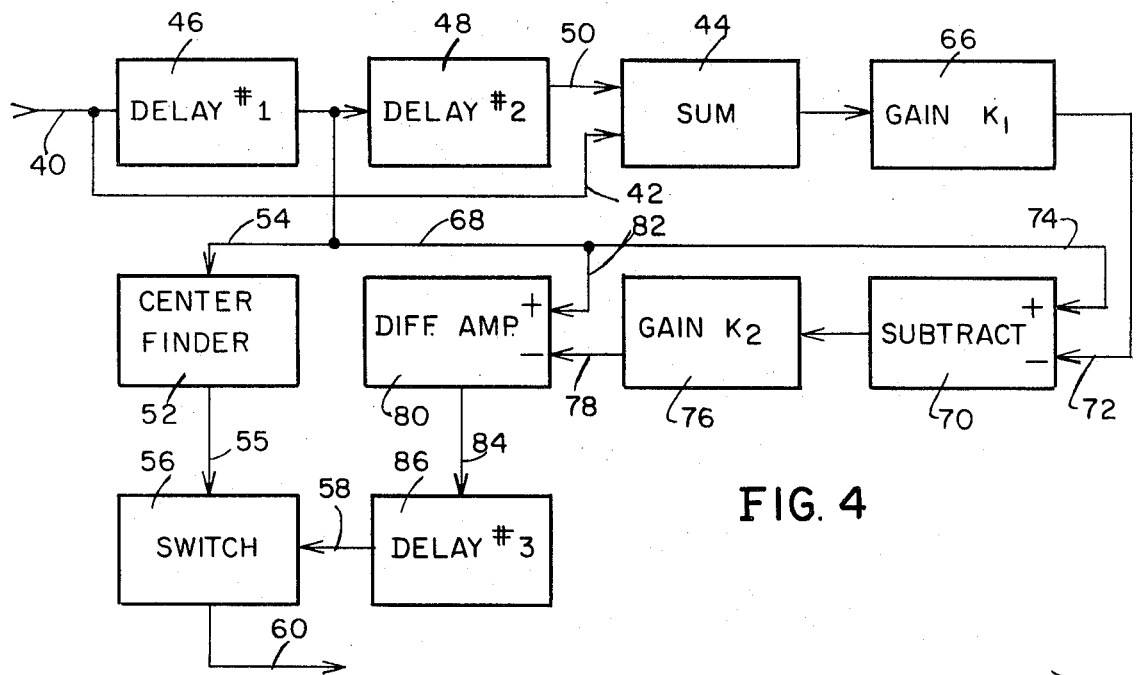
FIG. 4 is a block diagram of the pulse amplitude modification apparatus according to the invention.

The block diagram of FIG. 4 shows the electrical arrangement of elements by which the method of the invention can be implemented. The input pulses, such as A, B and C of FIG. 2 are applied to an input terminal 40 and directly to one input 42 of a summing circuit 44. The input pulses also are fed directly to a first delay element 46. The amount of delay provided by the element is empirically determined by aperture size, flow rate and other ascertainable parameters. For typical flow situations, and a 100 micron diameter aperture, a 5 microsecond delay is appropriate, for reasons later to be explained. The output of the first delay element 46 is coupled to a second delay element 48 and the output thereof is fed to the other input 50 of the summing circuit 44. The delay applied by the second delay element 48 can be equal to that applied by the first delay element 46.

Figure 5:
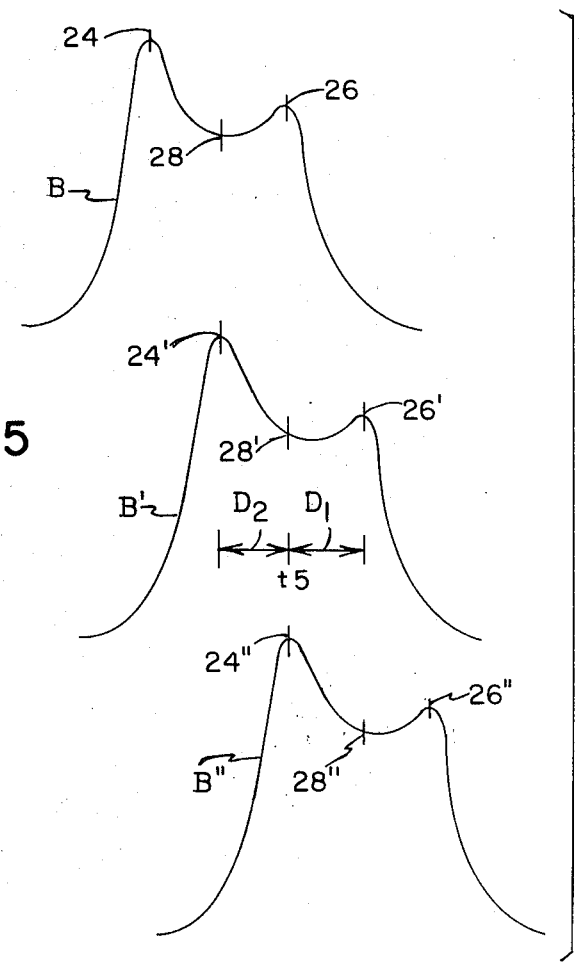
FIG. 5 is a diagram comprising a series of wave forms of a particle pulse relative to operations of the apparatus of FIG. 4.

With reference to FIG. 5, it will be seen how an input pulse of the type B is twice delayed. The pulse B' is that which has been delayed by the delay element 46 a duration $D_1$; and the pulse B'' has been delayed by the delay element 48 a duration $D_2$ with respect to the pulse B'. The delay $D_1$ of the pulse B' causes its center amplitude 28' to coincide with the trailing edge shoulder 26 of the pulse B. The delay $D_2$ applied to the pulse B'' causes its center amplitude 28'' to coincide with the shoulder 26' of the pulse B'. Since the pulse B'' has been delayed by the sum of $D_1 + D_2$, its leading edge shoulder 24'' coincides in time with the trailing edge shoulder 26 of the pulse B. Hence, the inputs 42 and 50 of the summing circuit 44 simultaneously receive the shoulder amplitudes at the same time that the center 28' of the once delayed pulse B' is available for utilization as a trigger or strobing signal.

A center finder circuit 52 is coupled by a line 54 to the output of the first delay element 46 for receiving the delayed pulse B'. The center finder circuit 52 operates to locate the center amplitude 28', notwithstanding the presence of leading or trailing edge peaks. Circuitry such as that taught in the earlier cited U.S. Pat. No. 3,668,531 can provide the function of the center finder circuit 52. It is known that a particle traversing the axis of a Coulter type of aperture and its sensing field, will move at a changing flow rate, such that the leading "half" of an ideal pulse A will be of greater duration than the trailing "half." Generally speaking, 60 percent of the pulse A will occur before its peak. To compensate for such a rightward skew of the pulse A, the center finder circuit 52 can be designed and adjusted to locate the "center" amplitude at the 60 percent of duration location. Such a circuit is encompassed within the identification herein of the center finder circuit 52, and within the use of the term "center amplitude."

The output of the center finder 52 is coupled to the control input terminal 55 of a switch 56. The switch 56 has a signal input terminal 58 and an output 60 and operates to pass any signal from the terminal 58 to the output 60 upon the strobing of the center finder 52. In this sense the switch 56 is an analog gate.

As earlier mentioned, the shoulders of a pulse need not be at any specific points along the wave form and in fact, because of the random shapes and durations of the particle-pulses, pulses, the locations of the shoulders cannot be expected to fall precisely as shown in FIGS. 2 and 3. It will be appreciated that the durations of the delays $D_1$ and $D_2$ and the location of the center amplitude 28' determine the locations of the shoulder amplitudes. The distance between the shoulder amplitudes is determined by $D_1 + D_2$ and is shown on FIG. 3 as spaced apart by the difference between the times $t_1$ and $t_3$. Since the shortest duration pulses are those of the A type, it is necessary for the delay duration $D_1 + D_2$ to be short enough so that the shoulder times $t_1$ and $t_3$ lie within the wave form A and at an amplitude high enough above noise and wave form leading and trailing edge irregularities. Yet also, $t_1$ and $t_3$ should be spaced apart far enough to be able to attain significantly different shoulder amplitudes, if they exist for any specific wave form. It has been ascertained that by locating the shoulder amplitudes, such as 62 and 64 in FIG. 3, for a type A pulse at about one half its amplitude, all of the shoulder amplitudes will lie at amplitude locations which provide statistically valid data.

Returning to the summing circuit 44, it can be constructed by employing an operational amplifier having at one of its inputs a summing junction which receives the inputs 42 and 50. The operational amplifier also would possess a resistive feedback path for control of its gain. Such gain control is represented by the block 66 coupled to the output of the summing circuit 44, and labeled "GAIN $k_1$." The purpose of the gain control 66 is to apply the factor $k_1$ to the shoulder average $\overline{SH}$ to generate a signal value $k_1 \overline{SH}$. Since the circuit 44 is a summing circuit, rather than an averaging circuit, the gain control 66 applies the factor $k_1/2$ to attain both $\overline{SH}$ from the shoulder amplitudes' sum and effect the factoring of $k_1$. The thus developed $k_1 \overline{SH}$ is in fact a negative value $-k_1 \overline{SH}$, since the normal action of an operational amplifier is to produce a signal inverted output.

The delayed pulse B' from the first delay element 46 also is coupled by a line 68 to a signal difference measuring or subtracting circuit 70. From FIG. 5 it will be observed that the summing of the shoulder amplitudes 26 and 24'' occurs at the same time that the center amplitude 28' is being coupled to the subtract circuit. Hence, the subtracting circuit sees $-k_1 + C$. The construction of the subtracting circuit 70 can be the same as that of the summing circuit 44 and would have the signal $-k_1 \overline{SH}$ received at an input 72 and the signal C received at an input 74 from the line 68; with the inputs 72 and 74 joining at a summing junction connected to one input of an operational amplifier. A resistive feedback connection of the operational amplifier defines the modification factor $k_2$, which circuit part is represented by a logic block 76, identified as "GAIN $k_2$." The resulting output from the subtracting circuit 70, after being factored by the constant $k_2$, has the signal value $-k_2 (C - k_1 \overline{SH})$ and is coupled to one input 78 of a differential amplifier 80. It should be noted that the constant $k_2$ is shown with the minus sign, since the output from the operational amplifier, shown by the logic blocks 70 and 76, normally is an inverted output.

The differential amplifier 80 has its second input 82 connected to the line 68 to receive the once delayed pulse B'. The output from the amplifier 80 is on a line 84 and will be the modified amplitude $C - k_2 (k_1 \overline{SH} - C)$ if it is strobed at the time $t_5$ (FIG. 5) that the center amplitude 28' of the pulse B' is present. As previously described, the location of the center amplitude 28' is the function of the center finder 52. A third delay element 86 is interposed between the output line 84 of the differential amplifier 80 and the input line 58 of the switch 56. The delay imposed by the third delay element 86 is to compensate for the inherent delays in all of the circuitry, especially the center finder 52, whereby the switch will be operated at the precise time that the center amplitude 28' is on the lines 68, 74 and 82 so as to precisely yield the desired result: $MA = C - k_2 (k_1 \overline{SH} - C)$.

From the foregoing, the construction and operation of the invention should be clear to those skilled in the art. Since it is likely that different sizes of scanning of apertures would be employed from time to time, the gain factor elements 66 and 76 can be constructed to switch their $k_1$ and $k_2$ constants, depending upon aperture size. One way of engineering the switching would be to place two groups of parallel connected operational amplifiers into the apparatus. One group would define the summing and $k_1$ gain elements 44 and 66 for each of the different aperture sizes; the other group would define the substracting and $k_2$ gain elements 70 and 76 and be addressable in pairs of one from each group for each respective aperture size. Also, it might be necessary to change the values of the delay elements 46 and 48, depending upon the size of the chosen aperture. Notwithstanding the variables, relatively simple empirical testing will enable one skilled in the art to choose the optimal parameters for the apparatus, once the aperture is selected and the particle suspension flow rate established.

What is sought to be protected by United States Letters Patent is:

1. A method for proportionately modifying the amplitude of particle-pulses of the type having a center portion with 2 shoulder portions on either side and produced by a Coulter type of scanning aperture; whereby the modified amplitude will be the same for all particles of the same volume, regardless of their differing trajectories through the aperture, said method comprising the steps of: measuring the amplitude of a particle-pulse at its center and at two shoulder points on opposite sides of the center, deriving from the relative magnitudes of said three amplitudes an increment of amplitude error, and adding said increment of amplitude error to said center amplitude to obtain the desired modified amplitude.

2. The method according to claim 1 in which its recited steps are caused to coact to yield the pulse modified amplitude according to the formula:

$MA = C + (C - \overline{SH})$ in which $MA$ is the modified amplitude, $C$ is the center amplitude, and $\overline{SH}$ is the average shoulder amplitude.

3. The method according to claim 1 in which said deriving includes the obtaining of the average amplitude of said shoulder amplitudes.

4. The method according to claim 3 in which said deriving further includes comparing said shoulder average amplitude with said center amplitude.

5. The method according to claim 4 in which said deriving includes measuring the difference between said center amplitude and said shoulder average amplitude.

6. The method according to claim 5 in which said deriving includes defining a first factoring constant that is proportional to the variations in shape of the particle pulses, and applying said first factoring constant to said shoulder average amplitude.

7. The method according to claim 6 in which said deriving includes defining a second factoring constant that is proportional to the total amount of amplitude modification and applying it to the difference between said center amplitude and said average shoulder amplitude.

8. The method according to claim 7 in which all of the included aspects of said deriving and said adding yield a modified pulse amplitude according to the formula:

$MA = C - k_2(k_1\overline{SH} - C)$ in which $MA$ is the modified amplitude, $C$ is the center amplitude, $\overline{SH}$ is the average shoulder amplitude, and $k_1$ and $k_2$ are factoring constants.

9. The method according to claim 1 in which said measuring of said shoulder amplitudes is accomplished with pulse delaying techniques which enable said measuring of both shoulder amplitudes at the same time.

10. The method according to claim 9 in which said measuring of said center amplitude is accomplished with pulse delaying techniques which enable said measuring of said center amplitude and both said shoulder amplitudes at the same time for comparing their relative magnitudes.

11. The method according to claim 10 including the step of defining said same time to be the time at which the delayed particle-pulse attains its center amplitude.

12. The method according to claim 10 in which the particle-pulse is twice delayed by separately defined delay values.

13. The method according to claim 12 in which said delay values are equal, to enable said deriving to develop an average shoulder amplitude coincident in time with said center amplitude.

14. The method according to claim 12 in which the sum of said delay values is a duration substantially equal to the duration that an ideal particle-pulse will be above its half amplitude.

15. Apparatus for proportionately modifying the amplitude of particle-pulses of the type having a center portion with 2 shoulder portions on either side and produced by a Coulter type of scanning aperture; whereby the modified amplitude will be the same for all particles of the same volume, regardless of their differing trajectories through the aperture, said apparatus comprising: means for measuring the amplitude of a particle-pulse at its center and at two shoulder points on opposite sides of the center, means for deriving from the relative magnitudes of said three amplitudes an increment of amplitude error, and means for adding said increment of amplitude error to said center amplitude to obtain the desired modified amplitude.

16. The apparatus according to claim 15 in which its recited means are constructed and arranged to coact to yield the pulse modified amplitude according to the formula:

$MA = C + (C - \overline{SH})$ in which $MA$ is the modified amplitude, $C$ is the center amplitude, and $\overline{SH}$ is the average shoulder amplitude.

17. The apparatus according to claim 15 in which said means for measuring said shoulder amplitudes includes pulse delaying means which enable measuring of both shoulder amplitudes at the same time.

18. The apparatus according to claim 17 in which said means for measuring said center amplitude includes pulse delaying means which enable measuring of said center amplitude and both said shoulder amplitudes at the same time for comparing their relative magnitudes.

19. Apparatus according to claim 18 in which said measuring means includes pulse center finder means for receiving an output from said delaying means and for defining by a trigger signal and same time to be the time at which a delayed particle pulse attains its center amplitude.

20. Apparatus according to claim 18 in which said pulse delaying means includes means for twice delaying the particle-pulse by separately defined delay values.

21. The apparatus according to claim 15 in which said deriving means includes means for obtaining the average amplitude of said shoulder amplitudes.

22. The apparatus according to claim 21 in which said deriving means further includes means for comparing said shoulder average amplitude with said center amplitude.

23. The apparatus according to claim 22 in which said deriving means includes means for measuring the differences between said center amplitude and said shoulder average amplitude.

24. The apparatus according to claim 23 in which said deriving means includes means for defining a first factoring constant that is proportional to the variations in shape of the particle pulses, and means for applying said first factoring constant to said shoulder average amplitude.

25. The apparatus according to claim 24 in which said deriving means includes means for defining a second factoring constant that is proportional to the total amount of amplitude modification and means for applying it to the difference between said center amplitude and said average shoulder amplitude.

26. Apparatus according to claim 25 in which all of the recited means included in said deriving means and said adding means are interconnected to generate a modified pulse amplitude according to the formula:

$MA = C - k_2(k_1\overline{SH} - C)$ in which MA is the modified amplitude, C is the center amplitude, $\overline{SH}$ is the average shoulder amplitude, and $k_1$ and $k_2$ are factoring constants.

27. Apparatus for proportionately modifying the amplitude of particle-pulses of the type having a center portion with 2 shoulder portions on either side and derived from a Coulter type of scanning aperture, said apparatus comprising: pulse delay means having an input, for receiving particle-pulses from a scanning aperture, and first and second outputs from which are respectively delivered each received pulse delayed by first and second different time values; an amplitude summing means having inputs respectively coupled to said delay means input and to said delay means second output; pulse center finder means coupled to said delay means first output; an amplitude substracting means having inputs respectively coupled to said delay means first output and an output of said summing means; differentiating means having inputs respectively coupled to said delay means first output and an output of said subtracting means; output means having a control input coupled to an output of said pulse center finder means, a signal input coupled to an output of said amplitude differentiating means, and an output from which, at the time of the center amplitude of a first delayed pulse, is obtainable a pulse amplitude modified proportionately to the shape of the associated received particle-pulse.

28. Apparatus according to claim 27 in which all of said means are constructed and arranged to generate a modified amplitude defined by to formula:

$MA = C + (C - \overline{SH})$ in which MA is the modified amplitude, C is the center amplitude, and $\overline{SH}$ is the average shoulder amplitude.

29. Apparatus according to claim 27 in which said pulse delay means is constructed to define said first time value to be one-half said second time value.

30. Apparatus according to claim 27 in which a first gain control means is coupled to said amplitude summing means for defining a first factoring constant that is proportional to variations in shape of the particle-pulses.

31. Apparatus according to claim 30 in which said summing means is defined by an operational amplifier having coupled to one input a summing junction for receiving the particle-pulse and its second delayed counterpart, and said gain control means is defined by a resistive feedback portion of said operational amplifier.

32. Apparatus according to claim 30 in which a second gain control means is coupled to the output of said subtracting means for defining a second factoring constant that is proportional to the total amount of amplitude modification.

33. Apparatus according to claim 32 in which said pulse delay means, said first and second gain control means are adjustable dependent upon the size of the scanning aperture.

34. Apparatus according to claim 32 in which all of said means are constructed and arranged to generate a modified amplitude defined by the formula:

$MA = C - k_2(k_1\overline{SH} - C)$ in which MA is the modified amplitude, C is the center amplitude, $\overline{SH}$ is the average shoulder amplitude, and $k_1$ and $k_2$ are factoring constants.

* * * * *